J. TURNER & I. E. PALMER.

2 Sheets—Sheet 1.

Machine for Making Covered Cord.

No. 3,345.

Reissued March 30, 1869.

Witnesses:
J. W. Coombs
Geo. Rich

Inventors:
J. Turner
I. E. Palmer
per Munn & Co

J. TURNER & I. E. PALMER. 2 Sheets—Sheet 2.

Machine for Making Covered Cord.

No. 3,345. Reissued March 30, 1869.

Witnesses:

W. Morris Smith

Sydney O. Smith

Inventors:

John Turner

Isaac E. Palmer by Attorneys

Brown, Coombs & Co

UNITED STATES PATENT OFFICE.

JOHN TURNER, OF NORWICH, AND ISAAC E. PALMER, OF MONTVILLE, CONNECTICUT; SAID PALMER ASSIGNOR TO SAID TURNER.

IMPROVEMENT IN MACHINES FOR MAKING COVERED CORD.

Specification forming part of Letters Patent No. 38,190, dated April 14, 1863; Reissue No. 3,345, dated March 30, 1869.

*To all whom it may concern:*

Be it known that we, JOHN TURNER, of Norwich, in the county of New London and State of Connecticut, and ISAAC E. PALMER, of Montville, same county and State, have invented an Improvement in Machinery for Manufacturing Covered Twist and Cord, of which the following is a full, clear, and exact description, reference being had to the accompanying drawings, forming part of this specification, in which—

Figure 1:
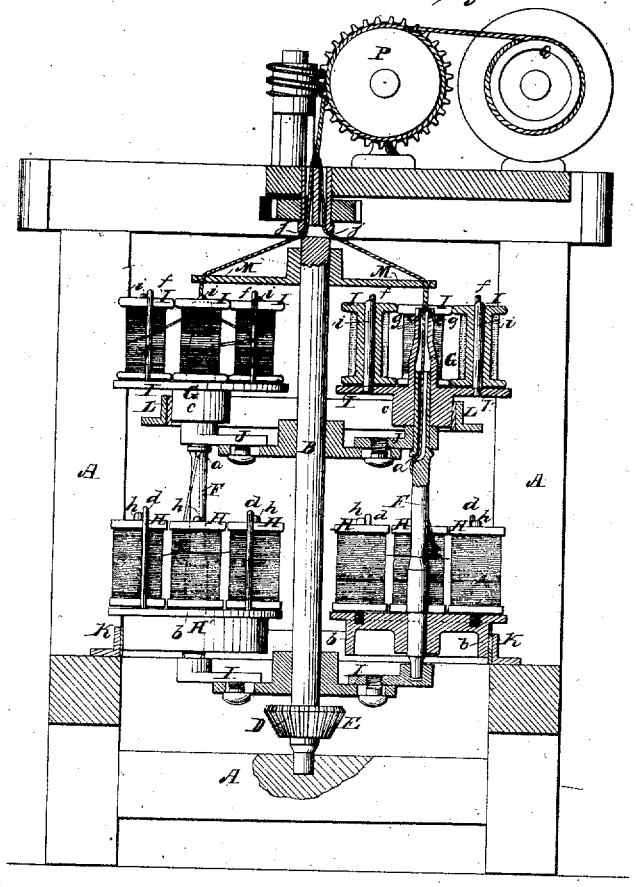
Figure 3:
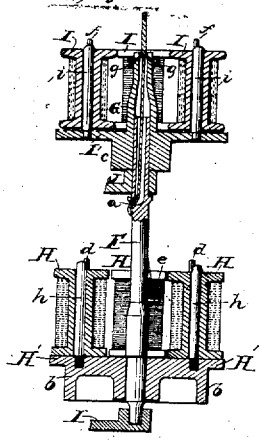
Figure 2:
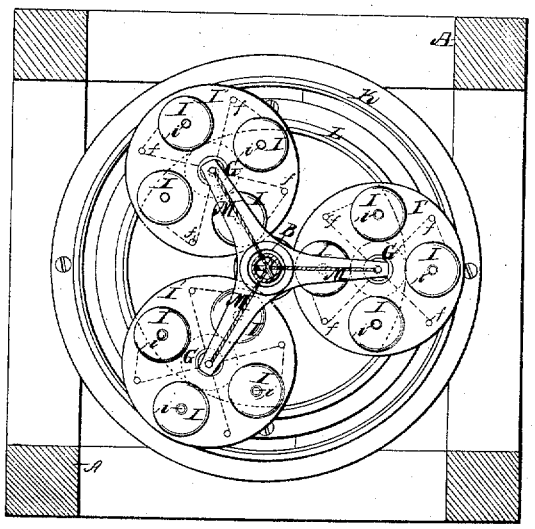

Figure 1 represents a vertical section of a machine for making covered cord. Fig. 2 is a horizontal section of the same above the upper series of bobbins. Fig. 3 is a sectional elevation of one of the strand-spindles, and Fig. 4 a top view of the same.

Similar letters of reference indicate corresponding parts throughout the several figures.

This invention consists in a novel combination and arrangement of mechanism for producing covered twist or cord; also embraces such a relative travel or action of devices as that the covering or finishing material is laid in a converse direction to the twist imparted to the respective strands.

Referring, in the first instance, to Figs. 1 and 2 of the drawings, A is the frame of the machine, having arranged—say in the center of it—an upright main rotating spindle, B, in its lower part a horizontal shaft, from which said spindle is shown as deriving rotary motion through a pair of bevel-gears. F F and G G are the strand-spindles, of which there may be any desired number, the same being carried by or operating in connection with and arranged parallel to and at equal distances apart from the main spindle B. The lower ones, F F, of these spindles carry the bobbins H H, which supply the yarn or thread to make the body of the twist of which the strands are to be composed, and the upper ones, G G, carry the bobbins I I, which supply the covering yarn or thread. The lower spindles, F F, are shown as fitted to bearings in arms I I and J J, which are firmly secured to the main spindle B, while the upper spindles, G G, which are made hollow, may be fitted to rotate upon the upper parts of their respective spindles F F, and supported by the upper arms, J J, of the main shaft. The spindles G G must be coincident or in line with the axes of the spindles F F. The upper parts of the spindles F F are also hollow down to a point below the arms J J, and an opening, *a*, leading into the interior of the said hollow portion of each, is provided through the side of the spindle. The several bobbins H are shown as fitted to turn easily upon upright spindles *h*, secured in disks H′ H′, which are fast upon their respective spindles F F, and the several bobbins I I are fitted to turn easily upon spindles *i i*, secured in disks I′ I′, provided upon their respective spindles G G.

The lower portions, *b b*, of the disks H′ may, if desired, be made in the form of pulleys, to work in contact with the inner periphery of a fixed ring, K, secured to the framing, and for the purpose of obtaining a rotary motion of the spindles F F on their respective axes, through the agency of the friction produced between the said portions *b b* against the said ring in the revolution of the spindles F F about the axis of the main spindle B; also the lower portions of the spindles G G may be made with pulley-like hubs *c c*, to work in contact with the inner periphery of a fixed ring, L, in the same manner as *b b* work in contact with K, for the purpose of producing the rotation of the spindles G on their respective axes in an opposite direction to the rotary motion of the main spindle by their planetary revolution about the axis of the spindle. The outer peripheries of *c c* and *b b*, or the inner peripheries of K and L, may be faced with leather, india-rubber, or other material by which a suitable degree of friction to produce the rotation of the strand-spindles on their respective axes may be obtained. Of course gear of any suitable kind may be substituted for the frictional arrangement or devices described, to give to the strand-spindles F and G their specified motions. The rotation of the spindles G G is in the same direction as that of F F; but the spindles G G rotate at a higher velocity than F F, and which difference in speeds is here shown as accomplished by the relative proportions between *b b* and K and between *c c* and L.

*d d* are guide-pins secured in the disks H H′ for conducting the several yarns or threads from the bobbins H H of each strand-spindle F to an eye, *e*, provided on one side of the spindle, the said eye conducting them to the opening *a*.

*f f* are guide-pins secured in the disks I′ I′, for conducting the several yarns or threads from the bobbins I I to openings *g g*, provided in the upper parts of the spindles G.

M M are a number of arms corresponding with the number of the spindles F F, and of those G G, firmly secured to the main spindle B above the spindles G G, and containing holes to guide the several strands from the latter spindle to the holes *j j*, which are here shown as provided in the upper part of the spindle B, to constitute what is termed in cordage-machines the "laying top."

P Q is an apparatus arranged on the top of the frame A, for taking up the cord as fast as it is made. This is substantially like the apparatus commonly used in rope-machines for taking up the finished rope, and derives motion through gearing from the main spindle B.

On setting the machine in operation, the spindles F F twist together the yarns from the bobbins H H, the said yarns passing through the spindles G G, as well as through the upper parts of F F, and the twist taking place between the openings *a a* and the holes in the arms M M, and just before their twist is quite completed, or thereabout, the strands receive the yarns from the bobbins I I, and, owing to the increased velocity of the spindles G G as compared with F F, the said yarns are wound upon and made to cover the exteriors of the strands before, say, the latter pass the guide-arms M M, which conduct them to the laying top, to be twisted together between the said top and the take-up apparatus by the rotary motion of the main spindle.

The machine represented in Figs. 1 and 2 has three sets of strand-spindles and bobbins for making three-strand cord, but the number of sets may be varied to make cord with a different number of strands.

Figure 4:
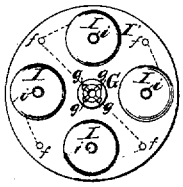

When it is desired to make covered twist without manufacturing the twist into cord, a single spindle, F, and a single spindle, G, and their appendages, combined as above specified, and shown in Figs. 3 and 4, may be so arranged and operated that the said spindles have simply a rotary motion about their own axes, and the covered twist will be produced in the same manner as has herein been described in the covering of the strands.

Figure 5:
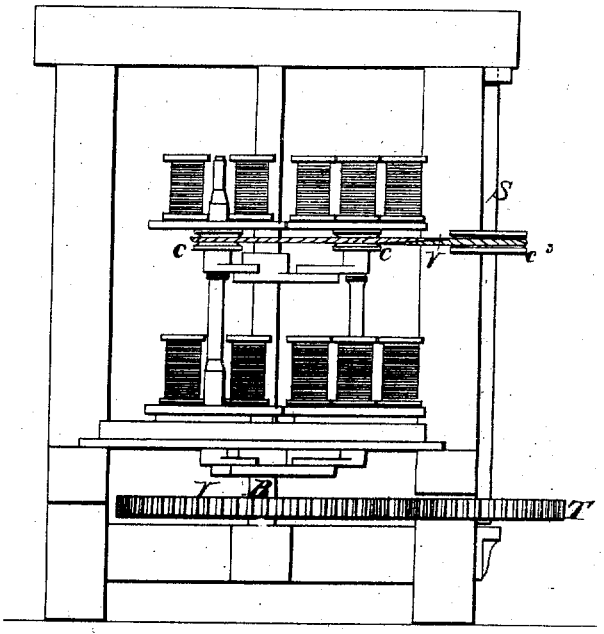

The covered twist and cord may be produced by making the upper spindles, G G, rotate in an opposite direction to the spindles F F, which mode of operation is embraced in this invention, and the means for accomplishing such reversed driving action need no description here, as the same, under different modifications, will readily suggest themselves to any mechanic of ordinary skill familiar with machinery for the manufacture of twist or cord. I have, however, represented in elevation in Fig. 5 of the drawings a simple modification of the machine shown in Figs. 1 and 2, whereby this method of driving the upper spindles is effected. The upper friction-ring is dispensed with and the pulleys *c c* of the upper spindles are all encircled and driven by a crossed band, V, which runs on a pulley, *c*³, on a spindle, S, which is geared by two spur-gears, T and U, with the main spindle B. Under such a method of manufacturing covered cord it will be seen that the covering is necessarily laid in a converse direction to the twist imparted to the respective strands of which the cord is formed, and whereby the covering yarns or threads are restrained from working in between the twists of the strands, and a more perfect covering is obtained with less covering material.

Although the spindles G G, instead of being fitted to rotate upon F F, may be entirely separated from them, it is important that they should be arranged with the axis of each spindle G in line with that of its respective spindle F, and the spindles G should in all cases be made hollow to admit of the passage of the twists or strands through them. By the divided arrangement of the holes or openings *g g* in the upper parts of the spindles G, and which holes in each spindle should lie in precisely the same horizontal line or plane, the covering-cords as passed or received from the several guiding-pins *f f* are prevented from fouling, and regularity and smoothness insured in the laying of the covering.

What is here claimed, and desired to be secured by Letters-Patent, is—

1. The arrangement of the main or laying spindle, the strand-spindles, and the hollow spindles which carry the covering-bobbins, as herein described—that is to say, the said hollow spindles having their axes in line with the axes of their respective strand-spindles, and arranged around the line of the axis of the main or laying spindle, substantially as herein set forth.

2. The combination, with the spindles F and their disks H′ and bobbins H, of the hollow spindles G and their disks I′ and bobbins I, the latter spindles, disks, and bobbins revolving independently of the former, substantially as and for the purpose herein shown and described.

3. The combination, with the spindles F and G, of the holes or openings *g g*, arranged, substantially as described, in the spindles G for operation in concert with guiding-pins *f f* to the yarns or threads from the bobbins rotated by the spindles G, substantially as described.

4. In a machine for making covered twist or cord, producing the revolution of the device or devices by which the covering-yarn is put on in a direction the reverse of that of the device or devices which produce the twisting of the yarns of which the strands are formed, whereby the covering or finishing material is laid on in a converse direction to the twist imparted to the respective strands, substantially as and for the purpose specified.

5. The combination of a revolving laying-up mechanism, three or more spindles for twisting the several strands together, and the strand twisting and covering devices rotating in opposite directions to each other, the whole operating substantially as herein described.

JOHN TURNER.
I. E. PALMER.

Witnesses:
J. G. BAKER,
MARIA L. MEEKER.